(12) United States Patent
Bogner

(10) Patent No.: US 7,987,291 B2
(45) Date of Patent: Jul. 26, 2011

(54) DATA DISTRIBUTION USING DNS

(75) Inventor: Etay Bogner, Tel-Aviv (IL)

(73) Assignee: Intel Corporation, Santa Clara, CA (US)

( * ) Notice: Subject to any disclaimer, the term of this patent is extended or adjusted under 35 U.S.C. 154(b) by 215 days.

(21) Appl. No.: 12/348,345

(22) Filed: Jan. 5, 2009

(65) Prior Publication Data

US 2009/0177798 A1 Jul. 9, 2009

Related U.S. Application Data

(60) Provisional application No. 61/019,356, filed on Jan. 7, 2008.

(51) Int. Cl.
*G06F 13/00* (2006.01)
(52) U.S. Cl. ........................................ 709/245
(58) Field of Classification Search ............ 709/245
See application file for complete search history.

(56) References Cited

U.S. PATENT DOCUMENTS

| 6,895,430 B1 * | 5/2005 | Schneider | 709/217 |
| 7,136,932 B1 * | 11/2006 | Schneider | 709/245 |
| 2004/0215707 A1 | 10/2004 | Fujita et al. | |
| 2007/0208805 A1 | 9/2007 | Rhoads et al. | |
| 2007/0208877 A1 | 9/2007 | Kelley et al. | |
| 2008/0010365 A1 * | 1/2008 | Schneider | 709/223 |

FOREIGN PATENT DOCUMENTS

WO 2008018055 A2 2/2008

OTHER PUBLICATIONS

Mockapetris, P., "Domain names—Concepts and Facilities", Request for Comments (RFC) 1034, Internet Engineering Task Force (IETF) Network Working Group, Nov. 1987, www.ietf.org.
Mockapetris, P., "Domain Names—Implementation and Specification", Request for Comments (RFC) 1035, Internet Engineering Task Force (IETF), 1987, www.ietf.org.
International Application PCT/IL2009/000021 Search Report dated Apr. 17, 2009.

* cited by examiner

*Primary Examiner* — Kenneth R Coulter
(74) *Attorney, Agent, or Firm* — Blakely, Sokoloff, Taylor & Zafman LLP

(57) ABSTRACT

A method for distributing data includes selecting for transmission to a client a plurality of data items from a data set. The selected data items are encapsulated in multiple CNAME-type resource records, each such resource record containing an artificial domain name including one or more of the data items. The resource records are arranged in a linked list, in which the artificial domain name contained in at least one of the resource records serves as a key for another of the resource records. The linked list of the resource records is uploaded to a Domain Name System (DNS) server for delivery to the client in response to a single DNS request submitted by the client.

20 Claims, 4 Drawing Sheets

DATA DISTRIBUTION USING DNS

CROSS-REFERENCE TO RELATED APPLICATION

This application claims the benefit of U.S. Provisional Patent Application No. 61/019,356, filed Jan. 7, 2008, which is incorporated herein by reference.

FIELD OF THE INVENTION

The present invention relates generally to computer networks, and specifically to distribution of information over computer networks.

BACKGROUND OF THE INVENTION

The Domain Name System (DNS) is an essential component of the Internet Protocol (IP) suite. DNS provides a distributed database of domain names and their associated information, such as IP addresses and alias names. DNS servers use the database to translate domain names into their corresponding IP addresses and to retrieve other information associated with specific names. DNS is described in detail by Mockapetris in "Domain Names—Concepts and Facilities," published as Request for Comments (RFC) 1034 (1987) of the Internet Engineering Task Force (IETF) Network Working Group; and in "Domain Names—Implementation and Specification," published as IETF RFC 1035 (1987). Both of these documents are incorporated herein by reference. They are available at www.ietf.org.

The DNS protocol is based on queries and responses (also referred to as requests and replies). The queries are directed from a client (which may itself be a DNS server) to a name server (NS), requesting information regarding a specific domain name. Each such query asks for either the IP address of the domain name or information that could be used in order to find the requested information. The DNS server returns a response to the client, containing one or more Resource Records (RR), each of which corresponds to a specific domain name. Each such RR is represented in the reply by a triplet (domain name, type, value), with the following meanings:
1. Domain name: The key of the RR, normally the domain name about which a query was made.
2. Type: Either A, or NS, or CNAME, as described below.
3. Value: The content of the RR, which may be an IP address (for type A) or another domain name (for type NS or CNAME).

The RR in the reply also carries a Time-To-Live (TTL) parameter, indicating the length of time for which the client may keep this RR in its cache. If TTL=0, the client should not store the record, and should consult a DNS server again the next time it requires information associated with the domain name in question.

The DNS request may also include an identifier (ID) field, with a unique ID generated by the requesting client. The server inserts this ID in the DNS response, thus enabling the client to associate the response with its own, earlier request.

Each RR in the DNS database is essentially a pair of a domain name (the key of the RR) and a piece of information related to this domain name. There are several types of RR, including A, NS, and CNAME:
Resource record of type A: The content of a RR of this type is simply the IP address of the key.
Resource record of type DNS Server (type NS): The content of a RR of this type is another domain name. The domain name in the RR is the name of a domain name server, which is the "authority server" for the key domain name. This record type means "you should ask the name server whose name is listed here for the IP address of the key," i.e., it redirects the requester to the authority name server.
Resource record of type Canonical Name (type CNAME): The content of a RR of this type is again a domain name, but in this case it is another domain name for which the key domain name is an alias. This record redirects the client to query a name server using the canonical name as the new key.

SUMMARY OF THE INVENTION

Although DNS was intended and designed specifically for distribution of network addresses corresponding to domain names, it has properties of robustness and scalability that can be used advantageously to distribute other types of information. These properties are exploited by embodiments of the present invention.

There is therefore provided, in accordance with an embodiment of the present invention, a method for distributing data, which includes selecting for transmission to a client a plurality of data items from a data set. The selected data items are encapsulated in multiple CNAME-type resource records, each such resource record containing an artificial domain name including one or more of the data items. The resource records are arranged in a linked list, in which the artificial domain name contained in at least one of the resource records serves as a key for another of the resource records. The linked list of the resource records is uploaded to a Domain Name System (DNS) server for delivery to the client in response to a single DNS request submitted by the client.

In a disclosed embodiment, the data items include respective actual addresses of multiple, different servers, and the actual addresses are encapsulated in artificial domain names in the resource records. The multiple, different servers may be configured to provide a predefined service to the client, wherein the service is specified by the key of the single DNS request. Typically, the linked list ends in an A-type resource record, which contains a numerical value associated with the service.

Typically, selecting the plurality of the data items includes selecting multiple different groups of the data items for transmission to different clients, and arranging the resource records includes creating multiple linked lists, including different sets of the resource records corresponding to the groups of the data items, and having different, respective keys for invocation by the clients in different DNS requests. In a disclosed embodiment, the data set is held by a data server, which uploads the linked list to the DNS server, and the artificial domain name is associated with a domain of the data server.

In disclosed embodiments, the method includes receiving and parsing the resource records at the client in order to extract the data items.

There is also provided, in accordance with an embodiment of the present invention, a method for accessing data, including accessing via a network, using a client program running on a client computer, a site having a uniform resource locator (URL). An artificial domain name is generated based on the URL, using a software agent running on the client computer, and a DNS request having a key including the artificial domain name is submitted from the client computer to a Domain Name System (DNS) server on the network. A DNS response is received at the client computer in reply to the DNS request, and is parsed using the software agent so as to extract auxiliary information that is encapsulated in the DNS response with respect to the site.

In a disclosed embodiment, the auxiliary information includes an address of a server, and the method includes accessing the server at the address using the client program. Typically, receiving the DNS response includes receiving a linked list of CNAME-type resource records.

There is additionally provided, in accordance with an embodiment of the present invention, apparatus for distributing data, including a network interface and a processor, which is configured to accept a plurality of data items, selected from a data set, for transmission to a client, to encapsulate the selected data items in multiple CNAME-type resource records, each such resource record containing an artificial domain name including one or more of the data items, to arrange the resource records in a linked list, in which the artificial domain name contained in at least one of the resource records serves as a key for another of the resource records, and to upload the linked list of the resource records via the network interface to a Domain Name System (DNS) server for delivery to the client in response to a single DNS request submitted by the client.

There is further provided, in accordance with an embodiment of the present invention, apparatus for accessing data, including a network interface and a processor, which is configured to access via the network interface, using a client program running on the processor, a site having a uniform resource locator (URL), to generate an artificial domain name based on the URL, using a software agent running on the processor, to submit, via the network interface to a Domain Name System (DNS) server on the network, a DNS request having a key including the artificial domain name, to receive a DNS response from the DNS server in reply to the DNS request, and to parse the DNS response using the software agent so as to extract auxiliary information that is encapsulated in the DNS response with respect to the site.

There is moreover provided, in accordance with an embodiment of the present invention, a computer software product, including a computer-readable medium in which program instructions are stored, which instructions, when read by a computer, cause the computer to accept a plurality of data items, selected from a data set, for transmission to a client, to encapsulate the selected data items in multiple CNAME-type resource records, each such resource record containing an artificial domain name including one or more of the data items, to arrange the resource records in a linked list, in which the artificial domain name contained in at least one of the resource records serves as a key for another of the resource records, and to upload the linked list of the resource records via a network to a Domain Name System (DNS) server for delivery to the client in response to a single DNS request submitted by the client.

There is furthermore provided, in accordance with an embodiment of the present invention, a computer software product, including a computer-readable medium in which program instructions are stored, which instructions, when read by a computer, cause the computer to run a software agent, which is operative, when a client program running on the computer accesses, via a network, a site having a uniform resource locator (URL), to generate an artificial domain name based on the URL, to submit a DNS request having a key including the artificial domain name to a Domain Name System (DNS) server on the network, to receive a DNS response from the DNS server in reply to the DNS request, and to parse the DNS response so as to extract auxiliary information that is encapsulated in the DNS response with respect to the site.

The present invention will be more fully understood from the following detailed description of the embodiments thereof, taken together with the drawings in which:

DETAILED DESCRIPTION OF EMBODIMENTS

Overview

Figure 1:
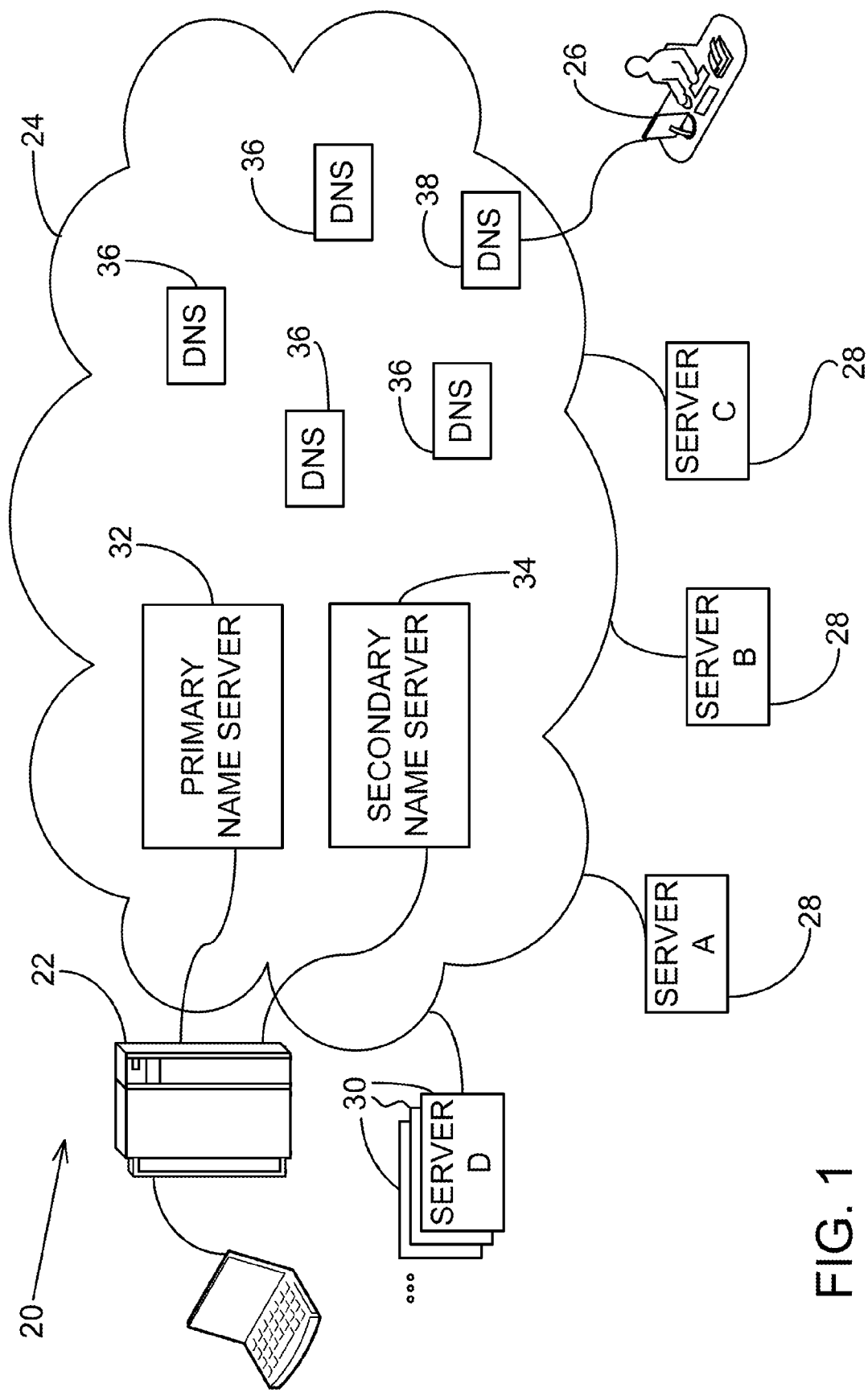
FIG. 1 is a block diagram that schematically illustrates an information distribution system, in accordance with an embodiment of the present invention.

Embodiments of the present invention that are described hereinbelow address the problem of distributing information from large data sets to client devices over communication networks, such as over the Internet. In many practical cases, a server holds a data set containing a large amount of data, only a small fraction of which is relevant to any particular end-user. Transmitting the entire data set to each user is wasteful of communication bandwidth, and at least some of the client devices used by the end-users may not have sufficient bandwidth or memory to download and process the entire list.

On the other hand, if every client device were to send its own specific information request to the server, the processing and communication capacity of the server may become overloaded. If there is an attack on the server, clients may be unable to get information at all. Although these sorts of problems may be addressed by deploying mirror servers at different locations, this sort of solution can be costly and cumbersome.

The embodiments that are described hereinbelow use the existing infrastructure and protocols of DNS in order to overcome these problems. For this purpose, a data server encapsulates selected data items from a data set into DNS resource records and uploads the records to a DNS name server. The records are then distributed and cached by the worldwide network of DNS servers in the same manner as conventional resource records. The records uploaded by the server may be in the form of DNS CNAME records, which are chained together in a linked list, as permitted by DNS convention. This sort of chaining may be used, for example, to provide multiple data items to a client in reaction to a single DNS request. The information that is encapsulated by the server in the DNS resource records may comprise actual domain names and/or IP addresses, but it may alternatively or additionally comprise other data, encapsulated by the server into the form of a domain name or IP address.

To access data items provided by the data server, the client device issues a DNS request with a key (in the standard form of a domain name) indicative of the desired information. The client sends the DNS request to a local DNS server (commonly referred to as a DNS gateway), just as it would send a standard DNS request. If a cached response is available, the DNS gateway returns this response. Cache hits are likely to be common, since users in the same geographical area, who share the same DNS gateway, will often require the same information. Therefore, clients will generally receive a response within a short time of submitting their requests. Otherwise, the DNS gateway obtains the requested information from the appropriate name server using standard DNS protocols. In either case, when the client receives the DNS responses from the gateway, it parses the resource records in order to extract the encapsulated information from the resource records.

Thus, the methods and systems described herein use the existing DNS infrastructure and protocols to distribute linked lists of relatively small data items, which may be taken from a large data set held by a data server. Each client device requests information using a specific key (in the form of a domain name), and is thus provided only with the information that is relevant to its query. The data server is required to upload the data items to the name server only periodically, and is not required to respond to all the client requests, since the DNS servers will handle most responses themselves based on resource records that they have already cached. Use of the DNS infrastructure in this manner permits information to be distributed with a high degree of scalability, fast response time, redundancy, security and robustness against attacks.

System Description

FIG. 1 is a block diagram that schematically illustrates an information distribution system 20, in accordance with an embodiment of the present invention. A data server 22 holds a large data set, comprising data items that are to be distributed via a network 24 to clients 26. (For the sake of simplicity, only a single client is shown in the figure, but typically server 22 provides data items to many clients, who may be widely distributed over different geographical areas.) Network 24 comprises the public Internet, as well as local access networks. Client 26, for example, would typically access the Internet via an Internet Service Provider (ISP) or enterprise network.

In this embodiment, it is assumed that the data items distributed by server 22 comprise configuration information, i.e., information to be used by client 26 in accessing a certain service via network 24. The configuration information may comprise, for example, the addresses and/or other data needed to access servers providing the service in question, such as "protected sites" at which the user of client 26 may access his bank account. A service of this sort is described, for instance, in PCT International Publication WO 2008/018055, whose disclosure is incorporated herein by reference. The description below will relate to this particular example for the sake of convenience and clarity of explanation. The principles embodied in system 20 and in the methods described below, however, may similarly be applied to distribution of other sorts of data items.

Data server 22 in this example belongs to a service organization that provides protected sites for many different banks (and possibly other institutions), including sites that are resident on various servers 28, 30 . . . . Server 22 holds configuration information with respect to all of these servers. Client 26, however, requires information only with respect to the user's own bank, which has a protected site accessible via servers 28 (identified as SERVER A, SERVER B and SERVER C). Client 26 has no use for information regarding other servers 30 (SERVER D, . . . ), and it is therefore desirable that server 22 provide client only with the configuration data items relating to servers 28. Although it would be possible to pre-provision client 26 with the relevant configuration information, this approach makes client installation more complicated and may fail if and when the configuration of servers 28 changes.

Instead, data server 22 distributes the necessary configuration information via the existing DNS infrastructure in network 24. For this purpose, server 22 uploads data items encapsulated in DNS resource records to primary and secondary name servers 32 and 34. (Although it would be possible to use only a single name server for this purpose, DNS convention mandates redundancy, which enhances the robustness of the system.)

For example, assuming server 22 belongs to the domain neocleus.net, the DNS records containing the configuration information for the protected sites of "mybank.com" could be a group of CNAME-type resource records containing the following artificial domain names:

protectedA.mybank.com.neocleus.net
protectedB.mybank.com.neocleus.net
protectedC.mybank.com.neocleus.net The data items in question (in this case the actual domain names of protected servers 28) are encapsulated in artificial domain names belonging to server 22. The resource records have the form required by DNS convention, but they are artificial in the sense that they do not point to actual resources available on the network in which servers 28 reside. Entering such an artificial domain name in a client browser will not lead the browser to the actual mybank.com server.

Server 22 groups the CNAME resource records in a linked list by having each resource record point to the next one. In other words, the domain name in resource record A is the key for resource record B, and B is the key for C, and so forth. The linked list terminates in an A-type record containing numerical data. Although DNS convention assumes that the data in the A-type record are an actual IP address, server 22 may use this record to convey substantially any sort of numerical data that will fit into thirty-two bits.

The resource records uploaded by server 22 are distributed by name servers 32 and 34 to other DNS servers 36, which cache the records. Typically, server 22 specifies a time-to-live (TTL) value for each record, which will force the DNS servers to flush and refresh the records periodically.

To enable the user of client 26 to access the protected site of mybank.com, client 26 sends a DNS request to a DNS gateway 38 that serves the client. The request contains the name "mybank.com" but is directed to the site of server 22. For example, the client may request a resource record for the domain "mybank.com.neocleus.net." Since users in the same geographical region often subscribe to the same services (such as on-line banking at a given bank), there is a good chance that DNS gateway 38 will have already cached the resource records needed to respond to the request. Otherwise, the DNS gateway will pass the request along to another DNS server 36, and so forth, until the required records are returned from the cache of a DNS server or from one of name servers 32, 34 (which are the "authoritative name servers" for the neocleus.net domain).

DNS gateway 38 returns a DNS response to client 26. By virtue of the CNAME linked list structure described above, the client will receive multiple resource records, containing multiple data items (in this case, multiple server addresses, which may be in the form of domain names or an IP addresses) in reaction to a single query. In many cases, the DNS gateway passes the multiple records to the client in one network packet (encapsulated in a User Datagram Protocol (UDP) frame, for example). Once the client has obtained the appropriate resource records, it extracts the actual addresses (such as the domain name "protectedA.mybank.com") and other necessary information, and uses the information in accessing the appropriate server 28.

Figure 2:
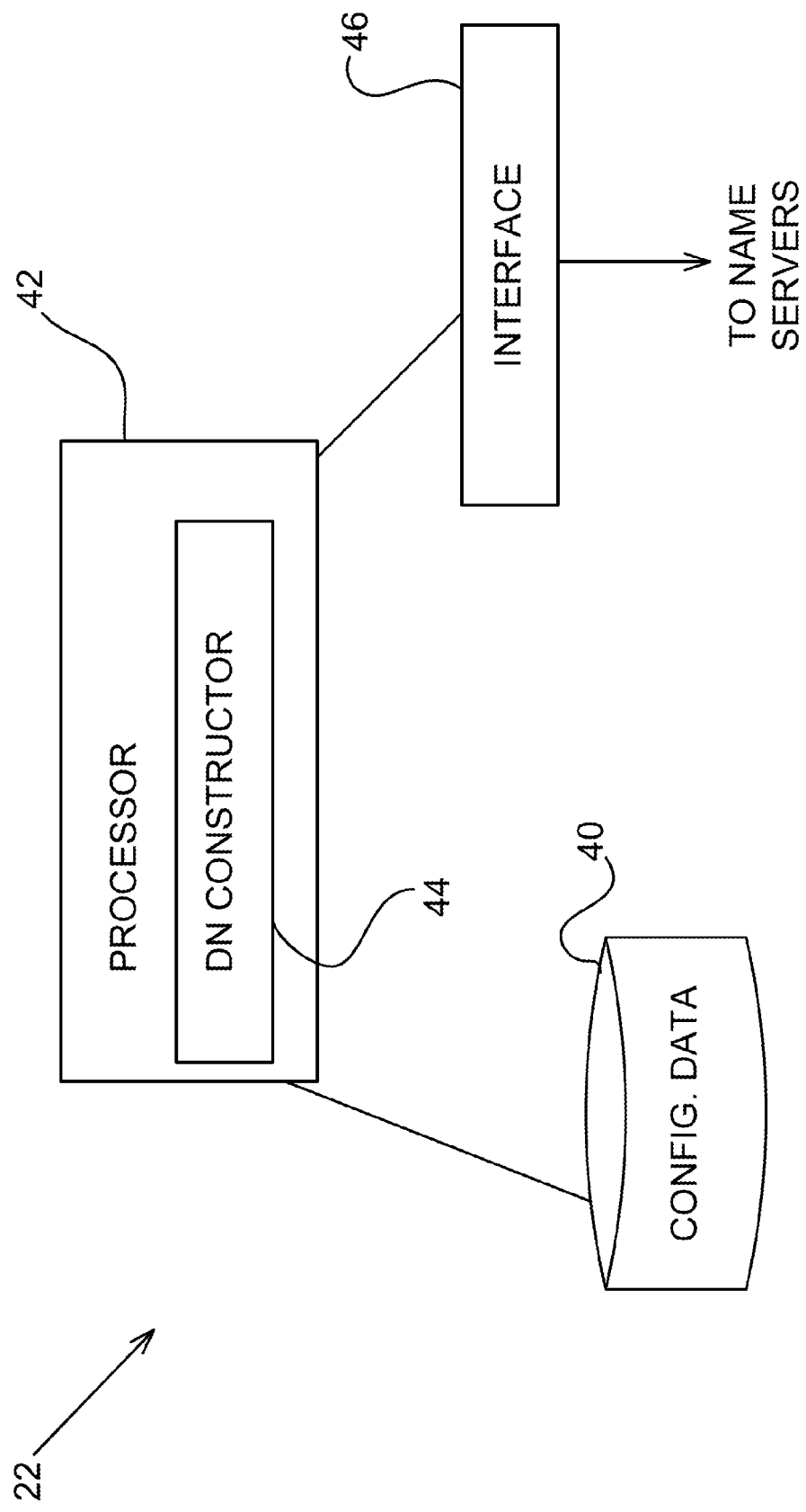
FIG. 2 is a block diagram that schematically shows functional components of a server computer, in accordance with an embodiment of the present invention.

FIG. 2 is a block diagram that schematically shows functional components of data server 22, in accordance with an embodiment of the present invention. The term "server" in this context simply refers to the function of this element of system 20, and server 22 may actually comprise any sort of computer with the appropriate resources to carry out this function. Server 22 comprises a data repository 40, which typically holds a large set of data items, such as the configuration data mentioned in the above example. A processor 42 implements a domain name (DN) constructor function 44, which encapsulates the data items in repository 40 into linked DNS resource records, as explained above. The processor uploads the resource records via an interface 46 to network 24. Alternatively, server 22 may itself be configured as a name server, simply exposing a DNS interface to the Internet.

Figure 3:
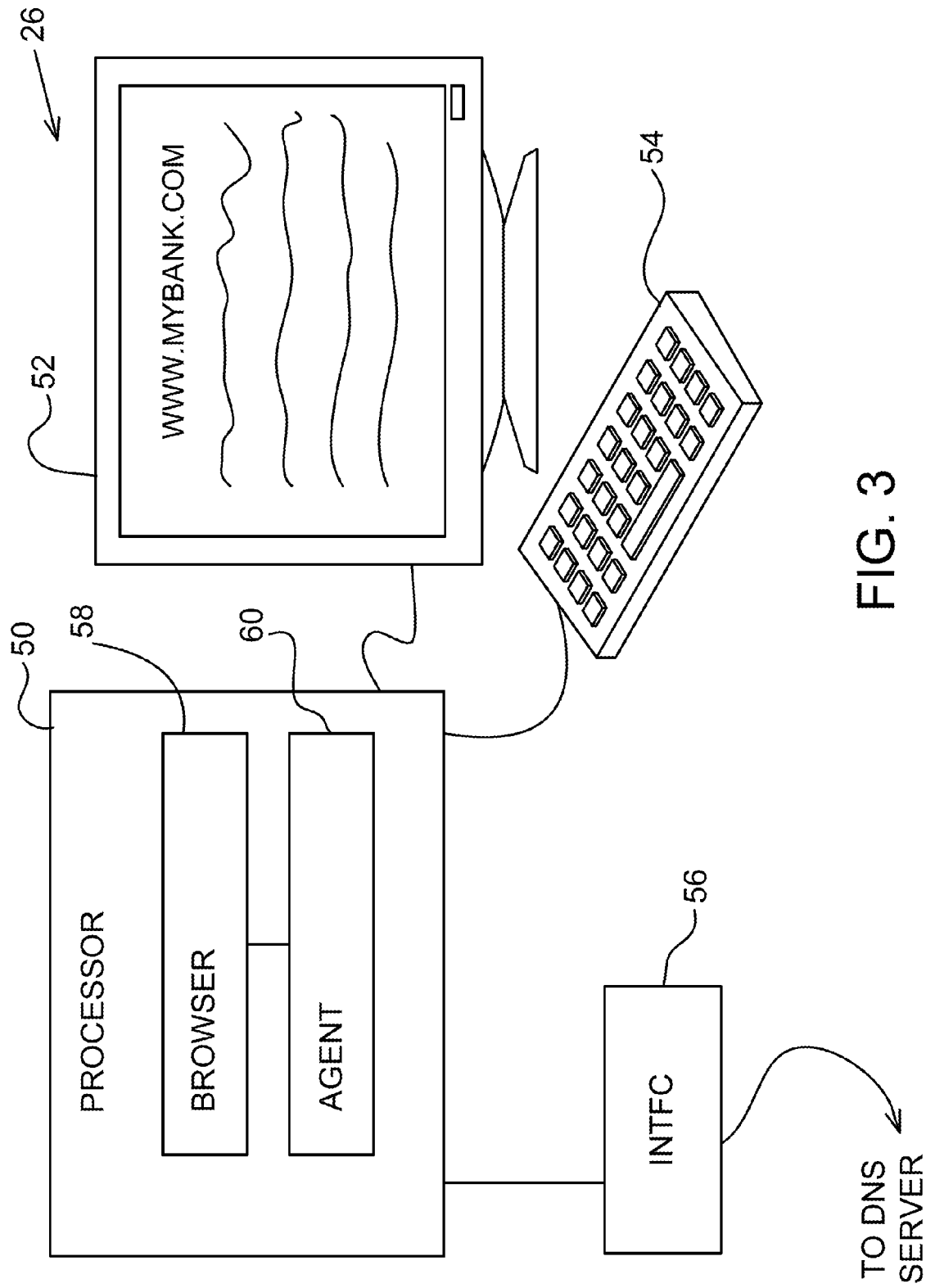
FIG. 3 is a block diagram that schematically shows components of a client computer, in accordance with an embodiment of the present invention.

FIG. 3 is a block diagram that schematically shows functional components of client 26, in accordance with an embodiment of the present invention. The client may comprise any suitable sort of computing device, including (but not limited to) a desktop or portable computer, a personal digital assistant (PDA), or a browser-equipped cellular telephone, for example. Client 26 comprises a processor 50, which is linked to appropriate user interface components, such as a display 52 and a keyboard 54. The processor communicates with the DNS gateway and other computers on network 24 via a network interface 56.

Server 22 and client 26 typically comprise general-purpose computing devices, which are programmed in software to carry out the functions that are described herein. This software may be downloaded to the respective computing devices in electronic form, via a network, for example. Alternatively or additionally, the software may be stored on tangible storage media, such as optical, magnetic, or electronic memory.

Processor 50 in client 26 runs a browser program 58, which is operated by the user to navigate to Web sites of interest. The browser maintains a cache of DNS records on client 26. When the user inputs or selects a uniform resource locator (URL), the browser first checks the cache for a corresponding record. If the record is not in the cache, the browser sends a DNS request to DNS gateway 38. In addition, a software agent generates and inputs appropriate artificial domain names (such as "mybank.com.neocleus.net") autonomously in order to retrieve information from server 22 based on the URLs of the sites accessed by the browser. Alternatively or additionally, the user may input such artificial domain names, as well.

For example, when the user navigates to the Web site of mybank.com, agent 60 may automatically generate and send a DNS request for the artificial domain name mybank.com.neocleus.net. Similar requests may be generated with respect to substantially any site the user visits (and the agent may be configured to generate such requests for all sites the user visits). The agent receives and parses the DNS response to extract the encapsulated information, and then caches the result, so that the browser will have the appropriate configuration information ready when needed. The agent may, for example, cause the browser to display a pop-up window, with a control enabling the user to access the bank's protected site via the address extracted by the agent from the DNS response.

Although the above example relates specifically to the operation of a software agent in conjunction with a browser, agent 60 may operate in conjunction with various other network-oriented application programs running on client 26. Examples of such application programs include iTunes™, Skype™, and File Transfer Protocol (FTP) client programs.

Method of Operation

Figure 4:
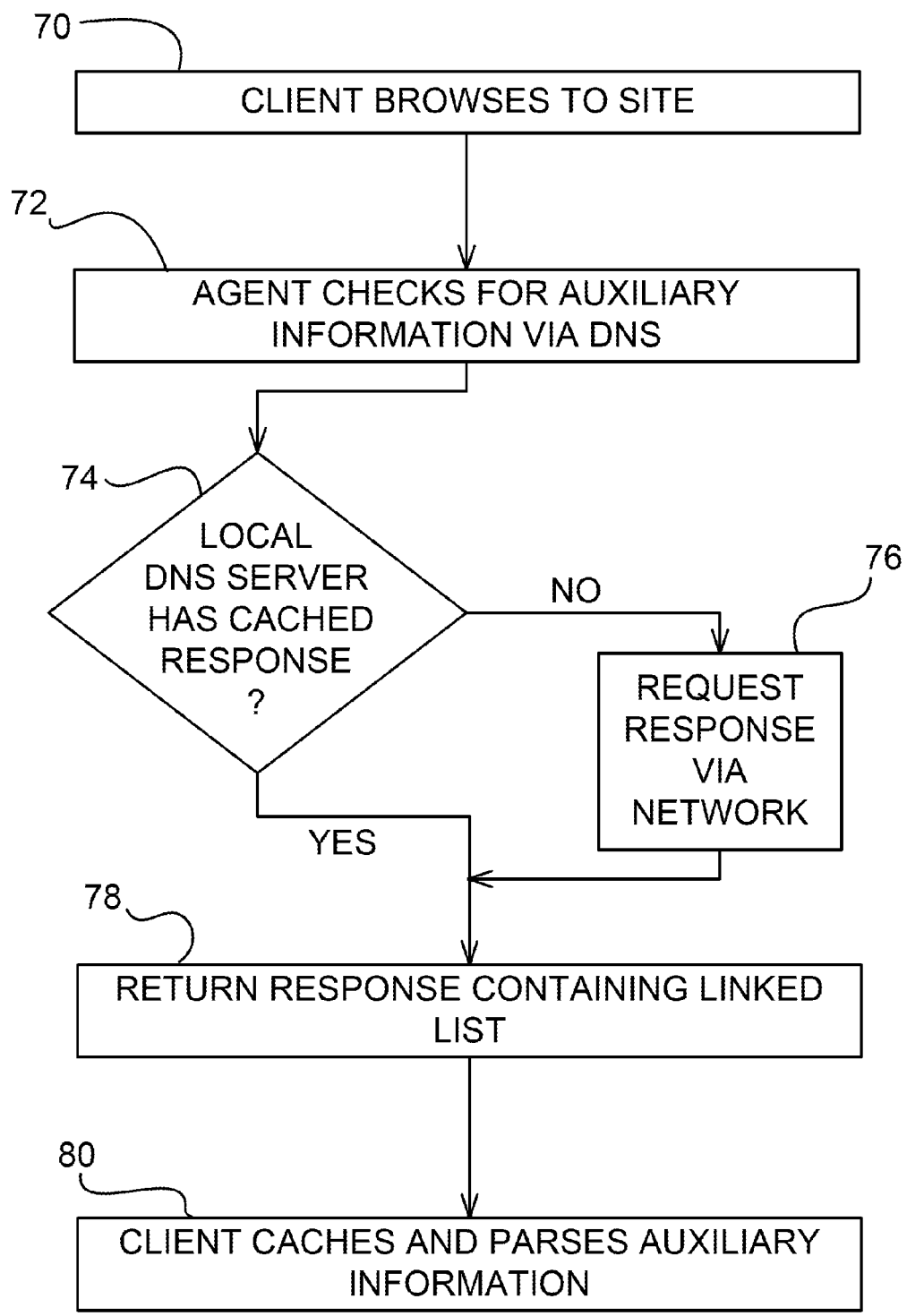
FIG. 4 is a flow chart that schematically illustrates a method for distributing information using DNS, in accordance with an embodiment of the present invention.

FIG. 4 is a flow chart that schematically illustrates a method for distributing information using DNS, in accordance with an embodiment of the present invention. The method is described hereinbelow, for the sake of convenience, with reference to the system shown in the preceding figures. The principles of this method may, however, be applied in substantially any system that is connected to and able to communicate with DNS servers. Thus, as noted above, the uses of the method are not limited to the context of Web browsers, but extend to other sorts of network-oriented applications, as well.

The method is initiated when client 26 browses to a given Web site, such as www.mybank.com, at a browsing step 70. Agent 60 checks for auxiliary information regarding this site by sending a suitable DNS request, at an information checking step 72. In the present example, the desired auxiliary information comprises configuration information, and specifically configuration information with respect to a protected site that is associated with mybank.com. For this purpose, the agent may generate a DNS request of the form:

mybank.com.neocleus.net, type=A, class=IN.

Optionally, the DNS request may specify a certain information channel, such as "protected.mybank.com.neocleus.net" to request configuration information for protected sites. In this case, other channels may provide other types of auxiliary information, for example, "vpn.mybank.com.neocleus.net" to obtain information needed to access a virtual private network (VPN) associated with mybank.com, or any other data items of relevance. Other example applications and corresponding information channels are described below.

The local DNS server receiving the client request, such as DNS gateway 38, checks its cache for the requested resource record, at a cache checking step 74. When a cache miss occurs, the local DNS server passes the request along to another DNS server 36, at a request relay step 76, and so forth, until the local DNS server receives and caches the response. The response to the DNS request may be empty, meaning, in the present case, that there are no protected sites for the domain in question, and this empty response will likewise be cached by the DNS server.

The local DNS server returns the response, whether full or empty, to the client, at a response step 78. In the present example, the initial DNS request might prompt a chain of DNS responses and further requests, resulting in download of a linked list of CNAME records in the following form:

mybank.com.neocleus.net
type=CNAME, class=IN, dlen=4
canonical name=protectedC.mybank.com.neocleus.net
ttl=1794 (29 mins 54 secs)
protectedC.mybank.com.neocleus.net
type=CNAME, class=IN, dlen=4
canonical name=protectedB.mybank.com.neocleus.net
ttl=1794 (29 mins 54 secs)
protectedB.mybank.com.neocleus.net
type=CNAME, class=IN, dlen=4
canonical name=protectedA.mybank.com.neocleus.net
ttl=1794 (29 mins 54 secs)
protectedA.mybank.com.neocleus.net
type=CNAME, class=IN, dlen=2
canonical name=neocleus.net
ttl=1794 (29 mins 54 secs)
neocleus.net type=A, class=IN, dlen=4
internet address=68.178.232.100
ttl=1794 (29 mins 54 secs)

The above list ends, in accordance with DNS convention, with an A-type record having a thirty-two bit numerical value. This value may point to an actual IP address, such as the address of an attestation server in the case of the service described in the above-mentioned WO 2008/018055. Alternatively, the numerical value may have some other meaning when parsed by the client.

As noted earlier, the local DNS server, such as gateway 38, may carry out the entire exchange shown above, and may then download the results to client 26, including all the resource records, in a single packet. Caching by the DNS gateway is thus a very efficient mechanism in this case.

Agent 60 receives, parses and caches the information in the DNS response, at a response reception step 80. In other words, the agent extracts the actual addresses (domain name or IP address)—such as "protectedA.mybank.com"—from the CNAME records. The agent caches the information for the time specified by the respective TTL fields. Empty responses are cached, as well, though the TTL may be shorter in this case. The extracted addresses are then available to browser 58, which may use the configuration information that the agent has received in accessing the site of interest.

Content distribution applications may also use the DNS-based techniques described above. For example, this sort of approach may be used in a directory information service for IP telephony. As another example, the above techniques can be used to distribute configuration information to enable users to access local servers for specific streaming media content. As in the case of Web access applications, the methods described above obviate the need for pre-provisioning of the client program.

Yet another possible use of the above techniques is in distributing digital certificates or public keys. Each key may be embedded in an artificial domain name, and these key "resource records" will then be cached by the DNS gateway.

Another mode of information distribution that can be served by the above techniques is publishing a list of services provided by a given site. For example, a DNS request with the key "Services.cnn.com.neocleus.net" may yield a linked list of responses that includes "news.cnn.com"->"money.cnn.com," etc.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for distributing data, comprising:
    selecting for transmission to a client a plurality of data items from a data set;
    encapsulating the selected data items in multiple CNAME-type resource records, each of said CNAME-type resource records containing an artificial domain name comprising one or more of the data items;
    arranging the resource records in a linked list, in which the artificial domain name contained in at least one of the resource records serves as a key for another of the resource records; and
    uploading the linked list of the resource records to a Domain Name System (DNS) server for delivery to the client in response to a single DNS request submitted by the client.

2. The method according to claim 1, wherein the data items comprise respective actual addresses of multiple, different servers, and wherein the actual addresses are encapsulated in artificial domain names in the resource records.

3. The method according to claim 2, wherein the multiple, different servers are configured to provide a predefined service to the client, wherein the service is specified by the key of the single DNS request.

4. The method according to claim 3, wherein the linked list ends in an A-type resource record, which contains a numerical value associated with the service.

5. The method according to claim 1, wherein selecting the plurality of the data items comprises selecting multiple different groups of the data items for transmission to different clients, and wherein arranging the resource records comprises creating multiple linked lists, comprising different sets of the resource records corresponding to the groups of the data items, and having different, respective keys for invocation by the clients in different DNS requests.

6. The method according to claim 1, wherein the data set is held by a data server, which uploads the linked list to the DNS server, and wherein the artificial domain name is associated with a domain of the data server.

7. The method according to claim 1, and comprising receiving and parsing the resource records at the client in order to extract the data items.

8. The method according to claim 7, wherein the resource records are received and parsed by a software agent running on the client, and wherein the software agent is configured to generate the key in the single DNS request responsively to a uniform resource locator (URL) of a Web site that is accessed by the client, and to cause the client to submit the single DNS request.

9. A method for accessing data, comprising:
    accessing via a network, using a client program running on a client computer, a site having a uniform resource locator (URL);
    generating an artificial domain name based on the URL, using a software agent running on the client computer;
    submitting, from the client computer to a Domain Name System (DNS) server on the network, a DNS request having a key comprising the artificial domain name;
    receiving a DNS response at the client computer in reply to the DNS request; and
    parsing the DNS response using the software agent so as to extract auxiliary information that is encapsulated in the DNS response with respect to the site.

10. The method according to claim 9, wherein the auxiliary information comprises an address of a server, and wherein the method comprises accessing the server at the address using the client program.

11. The method according to claim 9, wherein receiving the DNS response comprises receiving a linked list of CNAME-type resource records.

12. Apparatus for distributing data, comprising:
    a network interface; and
    a processor, which is configured to accept a plurality of data items, selected from a data set, for transmission to a client, to encapsulate the selected data items in multiple CNAME-type resource records, each of said CNAME-type resource records containing an artificial domain name comprising one or more of the data items, to arrange the resource records in a linked list, in which the artificial domain name contained in at least one of the resource records serves as a key for another of the resource records, and to upload the linked list of the resource records via the network interface to a Domain Name System (DNS) server for delivery to the client in response to a single DNS request submitted by the client.

13. The apparatus according to claim 12, wherein the data items comprise respective actual domain names of multiple, different servers, and wherein the actual domain names are encapsulated in artificial domain names in the resource records.

14. The apparatus according to claim 13, wherein the multiple, different servers are configured to provide a predefined service to the client, wherein the service is specified by the key of the single DNS request.

15. The apparatus according to claim 12, wherein the processor is configured to select multiple different groups of the data items for transmission to different clients, and to create multiple linked lists, comprising different sets of the resource records corresponding to the groups of the data items, and having different, respective keys for invocation by the clients in different DNS requests.

16. The apparatus according to claim 12, and comprising a client computer, which is configured to receive and parse the resource records in order to extract the data items.

17. Apparatus for accessing data, comprising:
a network interface; and
a processor, which is configured to access via the network interface, using a client program running on the processor, a site having a uniform resource locator (URL), to generate an artificial domain name based on the URL, using a software agent running on the processor, to submit, via the network interface to a Domain Name System (DNS) server on the network, a DNS request having a key comprising the artificial domain name, to receive a DNS response from the DNS server in reply to the DNS request, and to parse the DNS response using the software agent so as to extract auxiliary information that is encapsulated in the DNS response with respect to the site.

18. The apparatus according to claim 17, wherein the auxiliary information comprises an address of a server, and wherein the processor is configured to access the server at the address using the client program.

19. A computer software product, comprising a non-transitory computer-readable medium in which program instructions are stored, which instructions, when read by a computer, cause the computer to accept a plurality of data items, selected from a data set, for transmission to a client, to encapsulate the selected data items in multiple CNAME-type resource records, each of said CNAME-type resource records containing an artificial domain name comprising one or more of the data items, to arrange the resource records in a linked list, in which the artificial domain name contained in at least one of the resource records serves as a key for another of the resource records, and to upload the linked list of the resource records via a network to a Domain Name System (DNS) server for delivery to the client in response to a single DNS request submitted by the client.

20. A computer software product, comprising a non-transitory computer-readable medium in which program instructions are stored, which instructions, when read by a computer, cause the computer to run a software agent, which is operative, when a client program running on the computer accesses, via a network, a site having a uniform resource locator (URL), to generate an artificial domain name based on the URL, to submit a DNS request having a key comprising the artificial domain name to a Domain Name System (DNS) server on the network, to receive a DNS response from the DNS server in reply to the DNS request, and to parse the DNS response so as to extract auxiliary information that is encapsulated in the DNS response with respect to the site.

\* \* \* \* \*